United States Patent [19]
Groenenboom et al.

[11] Patent Number: 5,943,004
[45] Date of Patent: Aug. 24, 1999

[54] METHOD FOR THE TRANSMISSION OF RADAR TRANSMITTER PULSES

[75] Inventors: Albert Groenenboom, Hengelo; Wietze Jan Hendrik Meijer, Enschede, both of Netherlands

[73] Assignee: Hollandse Signaalapparaten B.V., Hengelo, Netherlands

[21] Appl. No.: 08/990,090

[22] Filed: Dec. 12, 1997

[30] Foreign Application Priority Data

Dec. 17, 1996 [NL] Netherlands ............................ 1004798

[51] Int. Cl.⁶ ...................................................... G01S 13/38
[52] U.S. Cl. ............................ 342/128; 342/129; 342/137
[58] Field of Search .................................... 342/128, 129, 342/131, 132, 201, 202, 203, 204, 137

[56] References Cited

U.S. PATENT DOCUMENTS

| | | | |
|---|---|---|---|
| 3,787,853 | 1/1974 | Brookner | 342/111 |
| 4,450,444 | 5/1984 | Wehner et al. | 342/25 |
| 4,743,910 | 5/1988 | Hill et al. | 342/159 |
| 5,347,283 | 9/1994 | Krizek et al. | 342/201 |

FOREIGN PATENT DOCUMENTS

| | | |
|---|---|---|
| 0 706 061 A2 | 4/1996 | European Pat. Off. . |
| 2 134 741 | 8/1984 | United Kingdom . |

*Primary Examiner*—John B. Sotomayor
*Attorney, Agent, or Firm*—Oblon, Spivak, McClelland, Maier & Neustadt, P.C.

[57] ABSTRACT

The invention relates to a method for realizing a radar transmission for a high-resolution radar. According to the method, a number of groups of pulses is transmitted with incremental frequencies, each group also comprising a number of pulses with incremental frequencies, which pulses are transmitted simultaneously or substantially simultaneously.

12 Claims, 3 Drawing Sheets

METHOD FOR THE TRANSMISSION OF RADAR TRANSMITTER PULSES

BACKGROUND OF THE INVENTION

The invention relates to a method for obtaining information regarding at least one target through the transmission of radar transmitter pulses and the subsequent processing, in a receiver and in a processor, of target echoes obtained in the listening intervals between radar transmitter pulses, for observing the target with a predetermined range resolution, in which process K bursts of radar transmitter pulses are transmitted, a different radar transmit frequency is selected for each burst and moreover, within a burst, groups of pulses with N mutually different transmit frequencies are transmitted repeatedly for the purpose of Doppler processing, so that per transmission, K.N. different radar transmit frequencies are transmitted to achieve the selected range resolution.

More specifically, the method is aimed at obtaining target information with an extremely high range resolution and a Doppler processing that is of a sufficient quality to distinguish the generally moving target from the generally stationary background. A method of this type is known from EP 0.706.061 A2. The method described in this patent specification renders a high range resolution and a good Doppler processing possible for a radar having a limited instantaneous bandwidth. According to the known method, pulses are transmitted at recurrent intervals, as is usual in radar engineering, whereupon the echoes from a transmitted pulse are received in a listening interval. This implies that a target has to be illuminated for a relatively long time, as the high range resolution is achieved by processing the echoes of a complete radar transmission. This is a time-consuming process for the radar apparatus, which usually operates multifunctionally and is therefore during that time unavailable for other tasks. Moreover, a long illumination time increases the risk of interference, for instance caused by jamming signals or a deviation of the target trajectory.

SUMMARY OF THE INVENTION

The present invention has for its object to reduce the illumination time without degrading the quality of the transmission. The invention is thereto characterized in that for the N pulses, the listening intervals at least substantially coincide.

This may for instance be accomplished by transmitting the N pulses simultaneously. It may be argued that a possible drawback is constituted by the fact that the transmitting power of modern solid-state radar transmitters is limited and the simultaneous transmission of N pulses would reduce the transmitting power per pulse even further. This drawback can be obviated by rendering the pulses relatively long and by modulating them. A type of modulation that could be considered in this respect is a linear frequency modulation, which enables pulse compression upon reception.

An exceptionally advantageous embodiment of the invention is characterized in that the N pulses are transmitted in succession, but at least substantially contiguously. Because a solid-state transmitter is usually quite suitable for the generation of long pulses, the transmitting power is not adversely affected. A concomitant advantage is that the phenomenon of beat occurring between pulses is prevented, which phenomenon could give rise to unexpectedly large signal strengths in a transmitter output stage and an antenna connected thereto. A further concomitant advantage is that the pulses transmitted in succession can be generated by means of hardware which is normally incorporated in a radar apparatus. If the pulses are transmitted simultaneously, partial duplication of the hardware required for pulse generation is practically unavoidable. Also in this embodiment where the pulses are transmitted in succession, it may be useful to modulate the pulses, by means of for instance a linear frequency modulation. Thus, a second, coarse, range resolution can be realized to preclude echoes from several targets from entering the processor simultaneously.

A still further advantageous realization of the method is characterized in that, within a group of N pulses the frequency difference between two pulses is smaller than the frequency difference between two bursts. This realization causes the frequencies, transmitted and received simultaneously, to be close together, as a result of which they can easily pass a single transmitter channel and a single receiver channel with a limited instantaneous bandwidth.

A still further advantageous embodiment enables the simplification of the processing required for obtaining the high range resolution and is characterized in that for a group of N pulses the frequency difference between two pulses is at least substantially a multiple of a first selected frequency difference.

A still further embodiment is characterized in that with respect to the bursts, the frequency difference between two bursts is at least substantially a multiple of a second selected frequency difference, which is larger than the first frequency difference. The frequency difference between two bursts is to be understood as the frequency difference between two reference frequencies within the respective bursts, for instance the lowest frequencies transmitted in the bursts.

Again, in order to simplify the required processing, the second frequency difference can advantageously amount at least substantially N times the first frequency difference, all this such that the pulses form a uniform grid in the frequency spectrum.

Filter circuits, basically consisting of matched filters, may be located at the output of the receiver channel output for the generation, per radar transmitter pulse, of range information pertaining to the target. In this respect, it is advantageous to implement the filter circuits such that the target echoes are moreover delayed to such an extent that corresponding target echoes appear at the various filter circuit outputs, so that it seems as if the N pulses were transmitted at an at least substantially equidistant succession of moments. This time delay can conveniently be effected on the basis of the different frequencies.

BRIEF DESCRIPTION OF THE DRAWINGS

The invention will now be described in further detail with reference to the following figures, of which.

DETAILED DESCRIPTION OF THE INVENTION

The use of a radar apparatus for observing a target with a high range resolution requires the transmission of a wideband radar signal. If the instantaneous bandwidth of the radar apparatus is not sufficient, it is possible to transmit a number of narrow-band pulses with mutually different frequencies. These pulses are preferably transmitted at a fixed pulse repetition rate and with fixed frequency differences, for instance 24 pulses increasing in frequency, always with a frequency difference of 1,666. Mc/s and a pulse repetition rate of one millisecond. The entire transmission then lasts 24 milliseconds. This length of time will only increase further if Doppler processing is necessary, which requires each pulse to be transmitted more than once, for instance four times, in order to suppress clutter. This considerable length of time is disadvantageous, because deliberate or accidental interference may adversely affect the observation of the target, just like a change in the target's speed or aspect angle.

Figure 1:
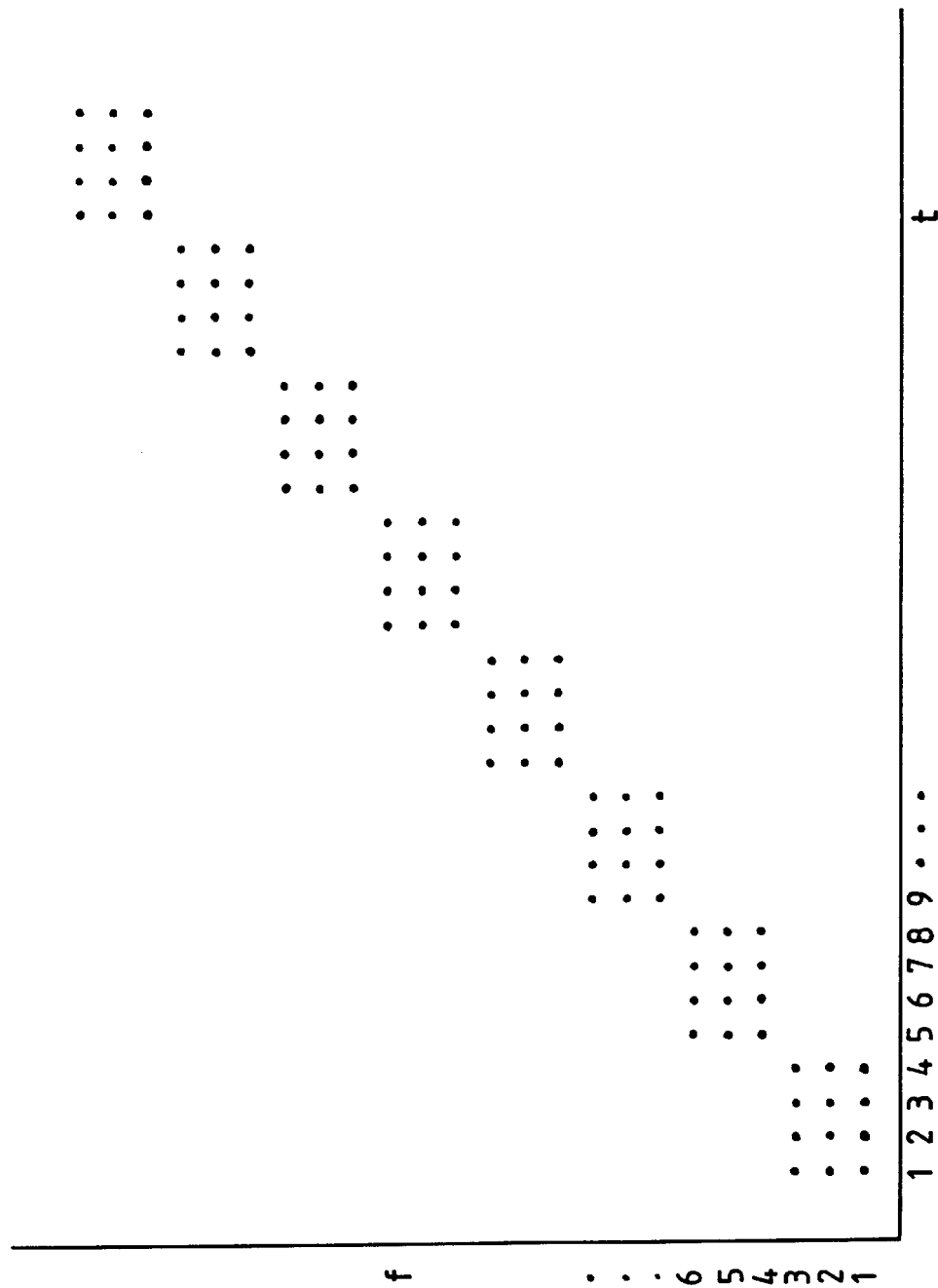
FIG. 1 represents a first type of transmission of radar transmitter pulses according to the invention.

FIG. 1 shows a transmission diagram of radar transmitter pulses according to a feasible embodiment of the invention in which pulses with twenty-four different frequencies are each transmitted four times for the purpose of Doppler processing. Assuming for instance that the instantaneous bandwidth of the radar apparatus is sufficiently wide for processing three pulses with different frequencies, e.g. f1, f2, f3 simultaneously, these pulses are transmitted simultaneously. Subsequently, f4, f5, f6 are transmitted simultaneously, followed by f7, f8, f9 until the transmission is completed. As is the case with other known radar apparatus, the groups of pulses have to be transmitted repeatedly a number of times in succession for the purpose of Doppler processing f1, f2, f3, for instance at t1, t2, t3, t4 etc.

Figure 2:
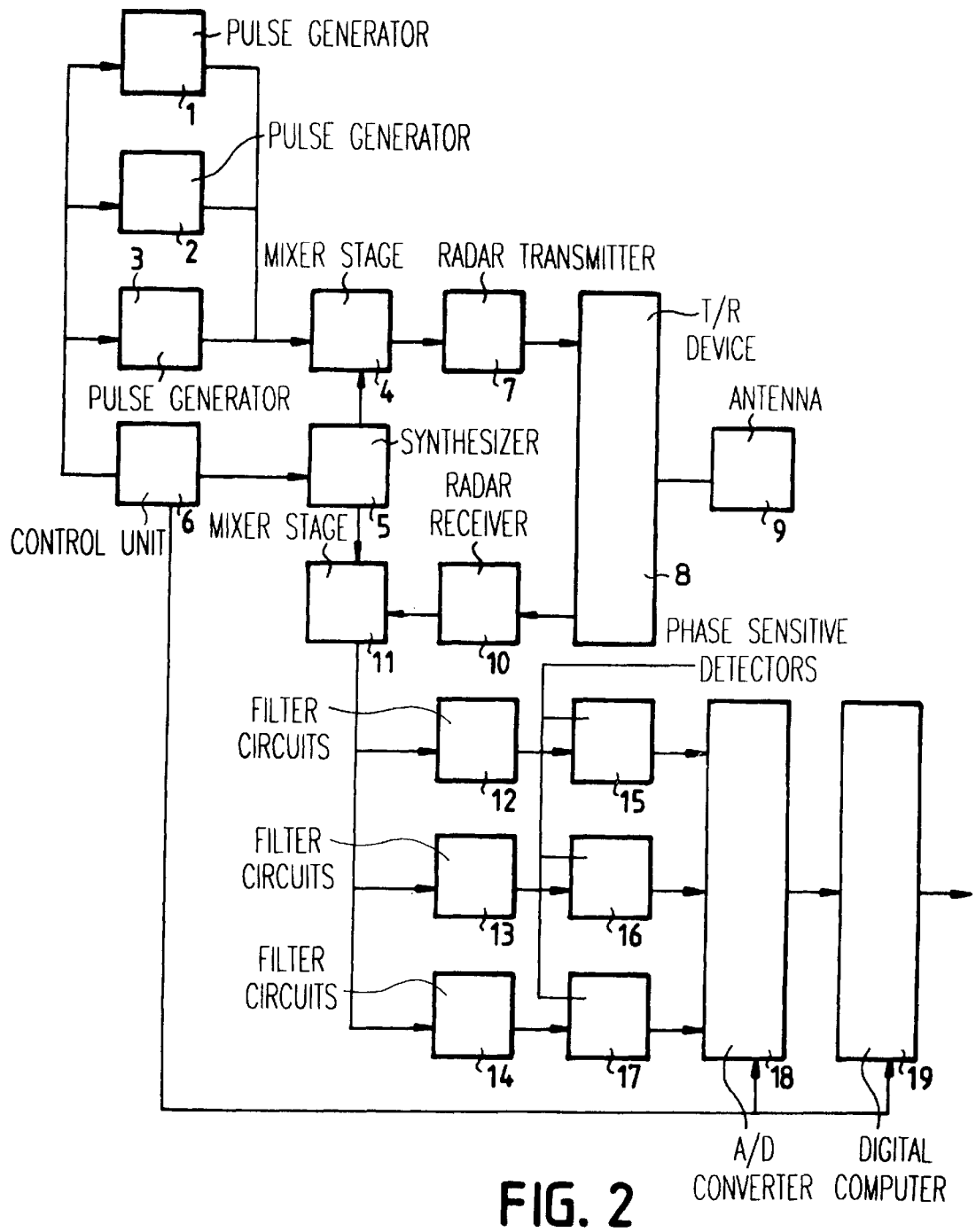
FIG. 2 represents a block diagram of a first embodiment of a radar apparatus in which the method can be employed.

FIG. 2 shows a block diagram of a radar apparatus in which this type of transmission can be realized. Each of the three pulse generators 1, 2, 3 simultaneously generates a transmitter pulse with mutually different frequencies. These transmitter pulses are subsequently applied to a mixer stage 4, which also receives a signal from a synthesizer 5. Synthesizer 5 can for instance generate eight different frequencies in the radar band in which the radar apparatus operates, with 5 Mc/s increments. Further there is provided a control unit 6, which controls the pulse generators 1, 2, 3 and synthesizer 5 in such a manner that, first, combined with the lowest synthesizer frequency, three transmitter pulses with a mutual frequency difference of 1,666 Mc/s are simultaneously generated, and which subsequently observes a listening time, after which the three transmitter pulses are transmitted three times in succession for the purpose of Doppler processing. The synthesizer frequency is then increased by 5 Mc/s, after which the following three transmitter pulses are transmitted repeatedly etc.

The generated transmitter pulses are amplified through a radar transmitter 7 and are supplied to an antenna 9 via a T/R device 8, for instance a circulator. Radar echoes received in antenna 9 are fed to a radar receiver 10 via T/R device 8 and are subsequently fed to a second mixer stage 11, which also receives a signal from synthesizer 5. The output signal of mixer stage 11 is applied to three filter circuits 12, 13, 14 which are complementary to the pulse generators 1, 2, 3, to that effect that filter circuit 12 passes only radar echoes from signals generated by pulse generator 1, filter circuit 13 passes only radar echoes from signals generated by pulse generator 2 and filter circuit 14 passes only radar echoes from signals generated by pulse generator 3, such on the basis of the frequency of the signals. Thus, the originally combined signals of pulse generators 1, 2, 3 can be entirely separated. The output signals of filter circuits 12, 13, 14 are subsequently applied to three phase-sensitive detectors 15, 16, 17 to each of which, as is customary with coherent radars, a suitable reference signal is supplied by the pulse generators 1, 2, 3. The output signals of the coherent detectors 15, 16, 17 are then applied to an analog-digital convertor 18 which, controlled by control unit 6, samples the output signals on the basis of a known distance to the target, obtained by means of a second radar apparatus or with the same radar apparatus in another operating mode, and which converts the output signals into three complex numbers representing the target strength, which numbers are subsequently applied to a digital computer 19 for further processing.

In order to remove clutter, the digital computer 19 first performs a Doppler processing to the set of 96 complex numbers thus obtained. This results in a set of 24 complex numbers representing the target, which set is subsequently subjected to a Fourier processing to obtain target information with a high range resolution, all this in accordance with procedures known in the art.

Because, according to the invention, the radar transmitter pulses are not transmitted equidistantly in time, whereas the Fourier processing presumes equidistant transmission, it is necessary to adjust the 24 complex numbers representing the target prior to Fourier processing. Supposing that with respect to the three pulses simultaneously transmitted at t1, the pulse with the lowest frequency f1 is transmitted at the right moment, then the pulse with f2 is transmitted too early by one third of the pulse repetition rate and the pulse with f3 by two thirds of the pulse repetition rate. The adjustment can then be easily made on the basis of these times and the known frequencies and is tantamount to a phase correction for the signals with frequencies f2, f3, f5, f6 etc, which adjustment can easily be computed in digital computer 19 and can for instance be integrated in the Doppler processing.

Figure 3:
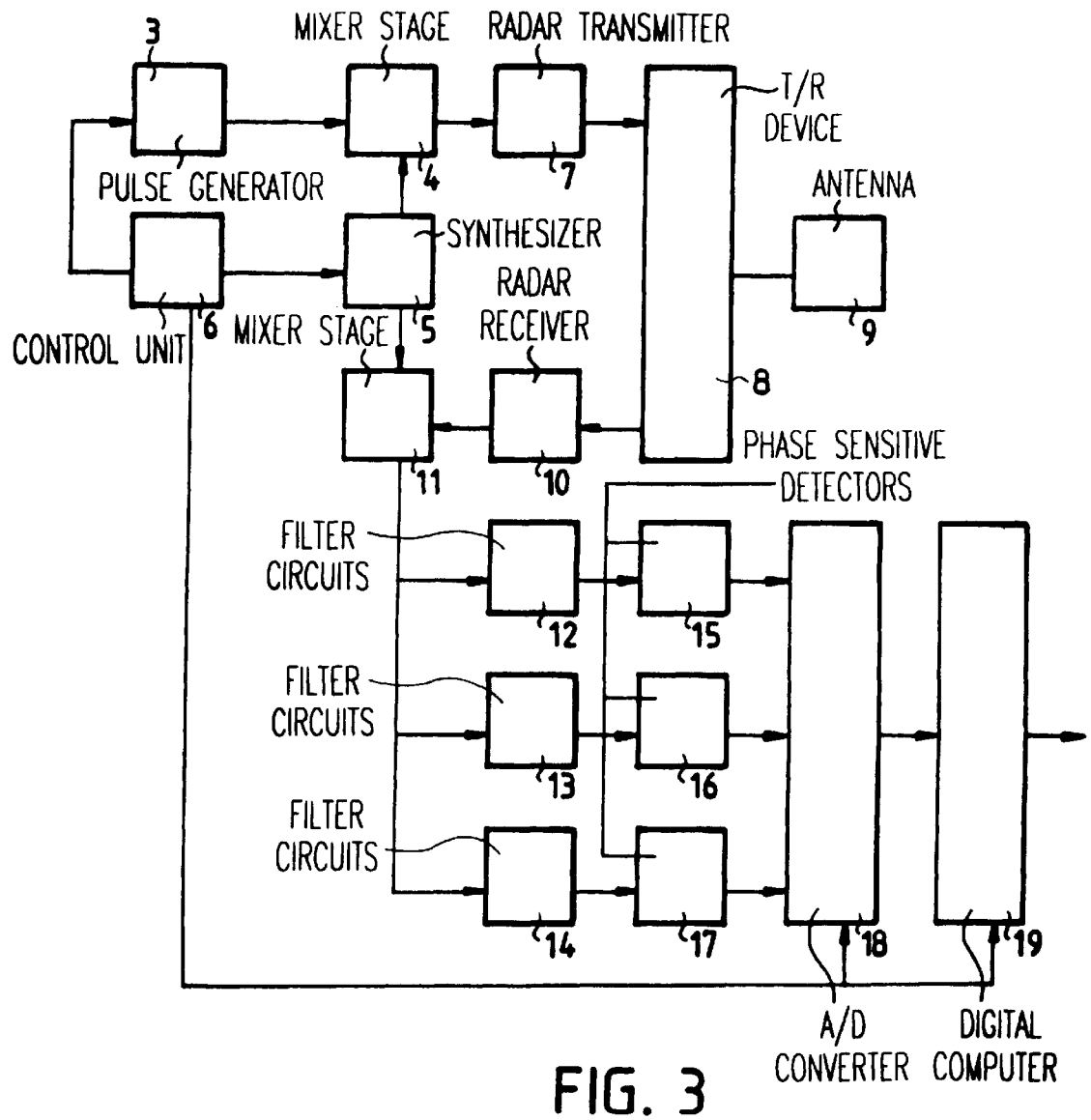
FIG. 3 represents a block diagram of a second embodiment of a radar apparatus in which the method can be employed.

Modern solid-state radar transmitters as for instance incorporated in phased array radar systems usually enable the generation of relatively long radar pulses, although they are less suitable for the generation of extremely strong radar pulses. The transmission diagram shown in FIG. 1 entails the drawback that the available transmitter power is spread over three transmitter pulses. This drawback can conveniently be obviated by transmitting the three transmitter pulses in quick succession instead of simultaneously, whereby a common listening interval is maintained. FIG. 3 shows a block diagram of this second embodiment of the radar apparatus in which this method can be used. In this case, pulse generator 3 generates three successive transmitter pulses with different frequencies, for instance also with a mutual frequency difference of 1,666. Mc/s. A most suitable device for this purpose is a SAW delay line which, triggered by control unit 6 and on the basis of a COHO signal, well-known in the art, can generate the three transmitter pulses. These transmitter pulses are then mixed with the aid of synthesizer 5 and mixer stage 4, are subsequently amplified to full power via radar transmitter 7 and transmitted via T/R device 8 and antenna 9. Upon reception, the radar echoes of the three pulses are again separated by the filter circuits 12, 13, 14 and are supplied to three phase-sensitive detectors 15, 16, 17, which are thereto also supplied with the COHO signal. Further processing is performed completely analogous to the processing described with reference to FIG. 2, with the exception of the phase correction. With regard to the phase correction, it should be considered that the pulse with frequency f2 is now transmitted too early by one third of the pulse repetition rate minus the pulse length, after which the phase correction can again be easily computed. Analogously, the pulse with frequency f3 is transmitted too early by two-thirds of the pulse repetition rate minus twice the pulse length.

Pulse generator 3 of FIG. 3 can also be implemented as a prior art direct synthesizer where the waveform to be generated is digitally stored in a read-only memory and, triggered by command unit 6, is read and supplied to a digital-analog convertor, followed by a low-pass filter. In both embodiments, the pulses may be modulated so as to allow pulse compression. A suitable type of modulation is a linear FM modulation. Actual pulse compression then takes place in filter circuits 12, 13, 14, which are for instance implemented as SAW delay lines. Pulse compression entails the advantage that long pulses can be employed, while it can nevertheless be prevented that multiple targets are simultaneously observed.

In the radar apparatus described with reference to FIG. 2 and FIG. 3, the invention is clarified on the basis of prior art techniques. of course, it is also possible to sample the output signal of mixer stage 11 directly with an analog-digital convertor and to perform the subsequent filtering operations digitally.

We claim:

1. A method for obtaining information regarding at least one target in order to observe said at least one target with a predetermined range resolution, comprising the steps of:

transmitting K bursts of radar transmitter pulses; and receiving and processing target echoes obtained in coinciding listening intervals between said radar transmitter pulses;

wherein said transmitting step comprises selecting a different radar transmit frequency for each burst, and within said each burst, substantially simultaneously transmitting N pulses with mutually different transmit frequencies multiple times in succession, so that per each transmission (K*N) different radar transmit frequencies are transmitted to achieve said predetermined range resolution.

2. The method of claim 1, wherein said N pulses are transmitted simultaneously.

3. The method of claim 1, wherein said N pulses are transmitted contiguous.

4. The method of claim 3, wherein within a group of N pulses, the frequency difference between two pulses is smaller than the frequency difference between two bursts.

5. The method of claim 4, wherein for a group of N pulses, the frequency difference between two pulses is at least substantially a multiple of a first selected frequency difference.

6. The method of claim 5, wherein the frequency difference between two bursts is at least substantially a multiple of a second selected frequency difference.

7. The method of claim 6, wherein said second frequency difference amounts to at least substantially N times the first frequency difference.

8. The method of claim 4, wherein said target echoes are processed simultaneously in a single receiver channel.

9. The method of claim 8, wherein said receiving step comprises passing target echoes to N filter circuits connected to said receiver channel.

10. The method of claim 9, wherein said receiving step comprises delaying target echoes in said filter circuits to such an extent that corresponding target echoes are shifted in time at said filter circuit outputs, and processing said target echoes as if the N pulses were transmitted as a succession of pulses transmitted equidistantly in time.

11. A radar system for obtaining information regarding at least one target in order to observe said at least one target with a predetermined range resolution, comprising:

a radar transmitter configured to transmit K bursts of radar transmitter pulses; and an antenna and a receiver configured to receive and process target echoes obtained in substantially coinciding listening intervals between said radar transmitter pulses;

wherein said transmitter is configured to select a different radar transmit frequency for each burst, and within said each burst, to substantially simultaneously transmit N pulses with mutually different transmit frequencies multiple times in succession, so that per each transmission (K*N) different radar transmit frequencies are transmitted to achieve said predetermined range resolution.

12. The radar system of claim 11, wherein said receiver is configured to substantially simultaneously process said target echoes.

* * * * *